United States Patent
Silk

(10) Patent No.: US 10,284,523 B1
(45) Date of Patent: May 7, 2019

(54) AUTOMATIC VIRTUAL SECURE CONNECTION USING PAIRED NETWORK DEVICES

(71) Applicant: Amazon Technologies, Inc., Reno, NV (US)

(72) Inventor: Robert James Silk, Morro Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 831 days.

(21) Appl. No.: 14/228,114

(22) Filed: Mar. 27, 2014

(51) Int. Cl.
*H04L 29/06* (2006.01)

(52) U.S. Cl.
CPC .............................. *H04L 63/0272* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,560,471 B2* | 1/2017 | Lin | ..................... | H04M 1/7253 |
| 2003/0140142 A1* | 7/2003 | Marples | ............ | H04L 29/12254 709/225 |
| 2007/0247395 A1* | 10/2007 | Barraclough | ........... | H04L 67/06 345/51 |
| 2012/0106559 A1* | 5/2012 | Kim | ...................... | H04L 63/029 370/401 |
| 2012/0254961 A1* | 10/2012 | Kim | ....................... | H04L 12/66 726/7 |
| 2014/0057560 A1* | 2/2014 | Lin | ..................... | H04M 1/7253 455/41.1 |

* cited by examiner

*Primary Examiner* — Esther B. Henderson
(74) *Attorney, Agent, or Firm* — Lee & Hayes, P.C.

(57) ABSTRACT

Embodiments provide techniques and example network devices that can automatically establish a virtual secure connection, e.g., VPN Tunnel, between separate networks including home and/or business networks without requiring additional VPN type infrastructure. The network devices described herein can be configured over the Internet, and do not require that the purchaser or an end user perform extensive configuration in order to use them. The network devices as described herein can tunnel all traffic between the separate networks to which the devices are paired as though a remote connected device is a local device on the local network. Remote computer or other network-enabled devices associated with the remote connected device can use and be accessible to computer or other network-enabled resources on the local network as though the separate networks are a single contiguous network without regard to the operating environment of the respective networks or devices thereon.

20 Claims, 7 Drawing Sheets

AUTOMATIC VIRTUAL SECURE CONNECTION USING PAIRED NETWORK DEVICES

BACKGROUND

For home users, small business, and enterprise users, it can be challenging to connect two separate networks together securely over the Internet. For example, consumers and small business often lack the capital to install full-fledged virtual private network (VPN) systems. In addition, such users often rely on family members and friends for informal help, rather than hiring information technology (IT) specialists.

Current approaches are primarily software based, are tied to the operating system, and often cause a non-technically proficient person seeking assistance to initiate and participate in actions as directed by a remote friend or family member. For example, the non-technically proficient person may need to send the remote friend or family member an email and perform authorization functions to allow the remote friend or family member to access the computer that is providing the non-technically proficient person difficulty.

In addition, there are times when people desire to access a home, small business, or enterprise system remotely, but rather than to help a non-technically proficient person, the remote access may be desired to use system resources such as printers, storage, or other resources. However, existing systems typically limit remote access to a specific server or area and do not allow users to access peripheral resources such as printers, storage, or other network resources.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Overview

Embodiments provide techniques and example network devices that can automatically establish a virtual secure connection, e.g., VPN Tunnel, between separate networks including home and/or business networks without requiring additional VPN type infrastructure. The network devices as described herein can tunnel all traffic between the separate networks to which the respective network devices are paired, as though a remote connected resource or network-enabled machine is a local resource or network-enabled machine on the local network. Remote resources or network-enabled machines associated with a remote connected network device can use and be accessible to local resources or network-enabled machines on the local network as though the separate networks are a single contiguous network.

The network devices described herein can be configured over the Internet, and do not require that the purchaser or an end user perform extensive configuration in order to use them. Moreover, the network devices and connections between them are environment independent or agnostic. Accordingly, the network devices and connections between them operate to establish a virtual secure connection and allow remote access to the local or home networks, remote resources or network-enabled machines connected thereto without regard to the types of hardware present on the local or home networks and without regard to the types of software, including operating systems, the remote resources or network-enabled machines run. This allows, for example, a purchaser who uses APPLE® hardware and corresponding operating systems to connect to and appear as a node on a remote local or home network that does not include APPLE hardware, and that runs other operating systems such as WINDOWS®, ANDROID®, UNIX®, etc., and vice versa or any combination thereof. Thus, several embodiments can provide automatic remote access to local or home networks, remote resources or network-enabled machines connected thereto without the remote user manually entering credentials to access the local or home networks or the local user sending an email so the remote user can access the local resource or network-enabled machines.

Illustrative Environment

The environment described below constitutes but one example and is not intended to limit application of the system described below to any one particular operating environment. Other environments may be used without departing from the spirit and scope of the claimed subject matter. The various types of processing described herein may be implemented in any number of environments including, but not limited to, stand-alone computing systems, network environments (e.g., local area networks or wide area networks), peer-to-peer network environments, distributed-computing (e.g., cloud-computing) environments, etc.

Figure 1:
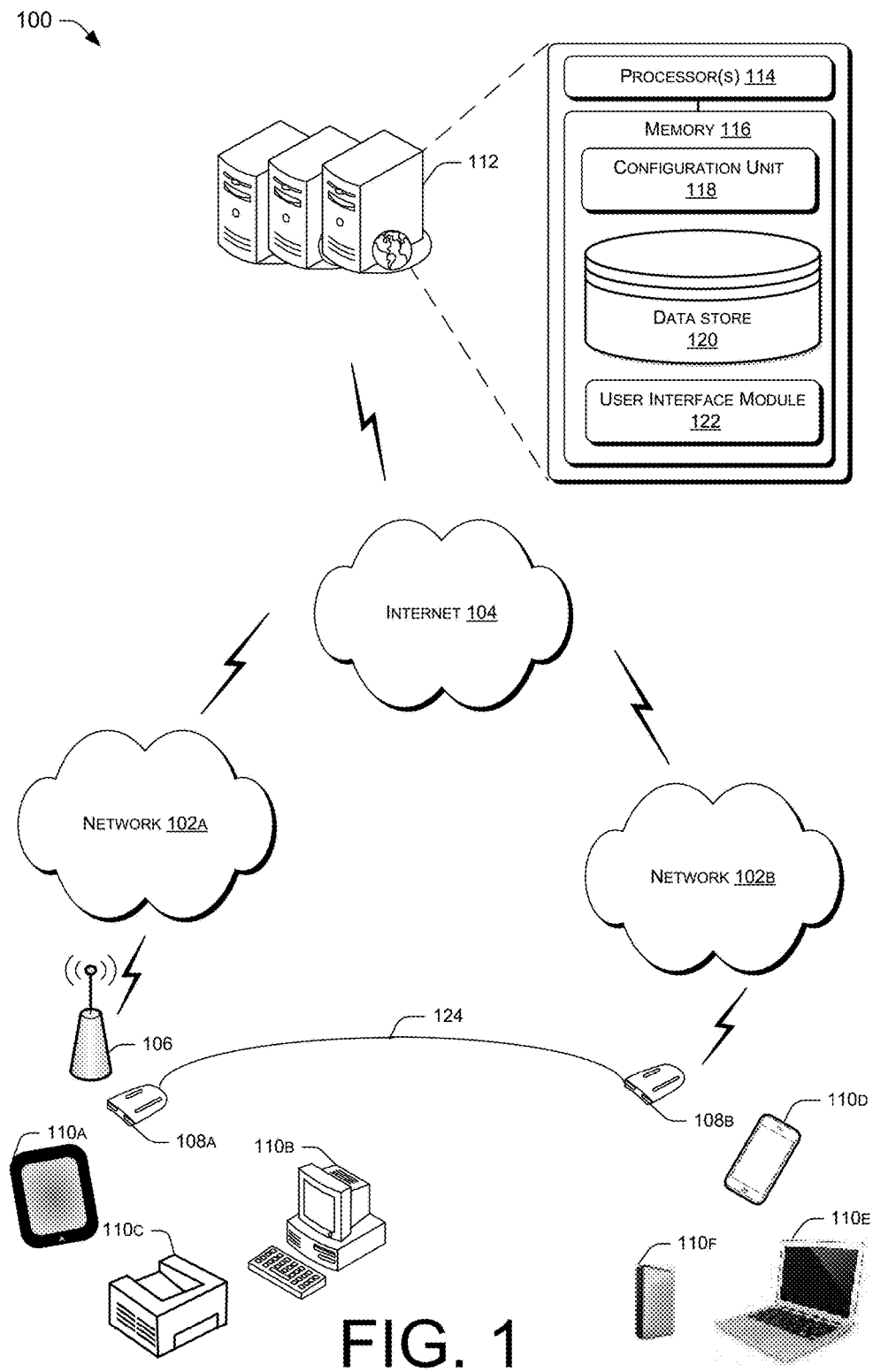
FIG. 1 is a diagram showing an example environment for an automatic virtual secure connection using paired network devices.

FIG. 1 illustrates an example operating environment 100 in which embodiments of paired network devices can operate to automatically establish a virtual secure connection. In some embodiments, the various apparatuses and/or components of environment 100 can communicate with one another and with external apparatuses via one or more local or home networks 102 and the Internet 104.

For example, network(s) 102 can include local or home networks, private networks such as an institutional and/or personal intranet, or some combination of private networks. Meanwhile, Internet 104 represents a public network, which can include satellite networks, cable networks, Wi-Fi networks, WiMax networks, mobile communications networks (e.g., 3G, 4G, and so forth) or any combination thereof. Network(s) 102 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 102 and Internet 104 can utilize communications protocols, including packet-based and/or datagram-based protocols such as Internet protocol (IP), transmission control protocol (TCP), user datagram protocol (UDP), or other types of protocols. Moreover, network(s) 102 and Internet 104 can also include a number of instruments that facilitate network communications and/or form a hardware basis for the networks, such as switches, routers, gateways, access points, firewalls, base stations, repeaters, backbone instruments, and the like.

In some embodiments, network(s) 102 can further include instruments that enable connection to a wireless network, such as wireless access point (WAP) 106. Embodiments support connectivity through WAPs 106 that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards. In various embodiments, network(s) 102 can include network devices 108 to establish a virtual secure connection in addition to a WAP 106 or instead of a WAP 106.

In some embodiments, environment 100 includes one or more network-enabled machines, such as network-enabled machine(s) 110. In one example, network-enabled machine(s) 110 can include computers, electronic book ("eBook") readers, printers, storage devices, or other network-enabled devices that are able to connect to a network such as a wireless network accessible through a WAP 106 and/or another wired or wireless network of network(s) 102 accessible through a network device 108, as will be described in more detail below.

For example, FIG. 1 depicts first network device 108A connected to a first local or home network 102A through a WAP 106. Network-enabled machine(s) 110A, 110B and 110C represent a diverse variety of types of machines; in this case, network-enabled machine 110A represents a tablet computer, network-enabled machine 110B represents a desktop computer and network-enabled machine 110C represents a network-enabled printer. Each of the network-enabled machines 110A, 110B and 110C connect to network 102A via first network device 108A. Meanwhile, FIG. 1 depicts second network device 108B connected to a second local or home network 102B. Network-enabled machine(s) 110D, 110E and 110F represent a diverse variety of types of machines; in this case network-enabled machine 110D represents a smartphone, network-enabled machine 110E represents a laptop computer and network-enabled machine 110F represents a network-enabled storage device. Each of the network-enabled machines 110D, 110E and 110F connect to network 102B via second network device 108B.

In the illustrated example, each of the network-enabled machines 110D, 110E and 110F are represented as network-enabled machine provided by Corporation A, which run Operating System A, while each of the network-enabled machines 110A, 110B and 110C are not represented as network-enabled machines from the Corporation A, and the network-enabled machines 110A, 110B and 110C do not run operating system A. However, embodiments are not limited to any particular type or provider of network-enabled machines, and network-enabled machine(s) 110 can include any type of computing device, including but not limited to desktop computers, personal computers, laptop computers, tablet computers, eBook readers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, kiosks, cameras, integrated components for inclusion in a computing device, appliances, or any other sort of network-enabled machine.

In some embodiments, first network device 108A and second network device 108B can be associated with each other at purchase. For example, both network devices can be associated with a user account during purchase of the network devices 108A and 108B. In this example, central server 112 can operate a provisioning service, which can serve as an intermediary to register the network devices 108A and 108B at acquisition, e.g., upon purchase, or during a leasing or borrowing process. As another example, a member of group of user(s) (e.g., users related socially, in a family, in a business, or otherwise) can share separately acquired individual network devices 108 and later associate the individual network devices 108 with one or more other network devices 108. Embodiments support scenarios where a first network device 108A and a second network device 108B are a same type of network device 108 or a different type of network device 108 configured to operate together. In each embodiment, network devices 108 can establish a virtual-secure connection between at least two separate networks 102. Such a virtual-secure connection facilitates access from a network-enabled machine 110A, 110B or 110C on network 102A to all of the network-enabled machines 110D, 110E and/or 110F and resources on network 102B regardless of whether network-enabled machines 110 are a same type of machine (e.g., multiple tablet computers, which can include multiple machines of the same type but different models), or are a different type of machine (e.g., a network-enabled printer and a laptop computer).

In some embodiments, environment 100 includes one or more server computers such as server(s) 112. Such server(s) can be any type of computer including, but not limited to, network servers, workstations, desktop computers, laptop computers, tablet computers, mobile computing devices, and the like. Further, the server(s) shown can include one or more computers that operate in a cluster or other grouped configuration to share resources, balance load, increase performance, provide fail-over support or redundancy, or for other purposes.

In some embodiments, server(s) 112 include one or more hardware components and/or software modules. For example, server(s) 112 can include one or more processors 114 that communicate with one or more instances of memory 116. The processor(s) 114 may read data from or write data to portions of the memory 116 in performing any of the functions described herein. Additionally, the memory or other computer-readable media may contain software instructions that, when loaded into the processors, cause the server to perform any of the functions described herein.

The memory 116 may contain one or more software modules that define a device configuration unit 118, which represents a software-based implementation of suitable instructions for configuring a network device 108 for a particular purchaser. In some embodiments, device configuration unit 118 can be considered a server-side component that can cooperate with a corresponding client-side component residing on, for example, one of the network-enabled machine(s) 110 or network device(s) 108. The device configuration unit 118 can interact with data store 120 to configure the network device(s) 108 for purchasers, in some instances in cooperation with a user interface module 122. The data store 120 can, for example, include a database that houses information relating to particular purchasers, such that when a given purchaser orders a network device 108, the device configuration unit 118 can configure the network device 108 for that particular given purchaser, and cause the configured network device 108 to be delivered to the purchaser. Alternately, upon receiving one or more network devices 108, a purchaser or other user can access a site or service, such as one hosted by server(s) 112 via a user interface created by user interface module 122 to configure the one or more network devices 108 for use on a chosen local or home network 102. In various embodiments configuration unit 118 and/or data store 120 include functionality or data to confirm authorized access of the purchaser or other user to access the chosen local or home network. For example, according to a password or passphrase received via user interface module 122 from the purchaser or other user corresponding to an account through which the one or more network devices 108 were purchased.

As another example, a purchaser can buy two network devices 108, associate a first one of the network devices 108 with the purchaser's local or home network, and associate a second network device 108 with the first network device 108. Then the purchaser can cause the second network device 108 to be sent to a family member, friend, or colleague who connects to the Internet via a different local or home network 102. The second network device 108, when connected to the local or home network 102 of the family member, friend, or colleague can automatically establish a virtual secure connection 124, e.g., VPN tunnel between the local or home network 102 of the family member, friend, or colleague and the local or home network 102 of the purchaser.

In various embodiments, the processor(s) 114 may execute one or more modules and/or processes to cause the server(s) 112 to perform a variety of functions, as set forth above and explained in further detail in the following disclosure. In some embodiments, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

In at least one configuration, the memory 116 of the server(s) 112 may include components that may be used to facilitate interaction between a central service provider that operates the server(s) 112 and the network-enabled machines 110 and/or the network devices 108.

Depending on the exact configuration and type of the server(s) 112, the memory 116 may include volatile memory (such as RAM), non-volatile memory (such as ROM, EEPROM, flash memory or other memory technology, CD-ROM, digital versatile disks (DVD), miniature hard drive, memory card, or the like), any other non-transitory computer-readable media that can be used to store desired information and that can be accessed by the processor(s) 114, or some combination thereof. The memory 116 may be embodied in hard disk drives, solid state memories, any other type of non-transitory computer-readable storage medium, and/or a file, a database, a relational database, stored in any such non-transitory computer-readable medium accessible to the server(s) 112. The memory may also be distributed or partitioned across multiple local and/or storage devices without departing from the spirit and scope of the present disclosure.

Illustrative Network Device

Figure 2:
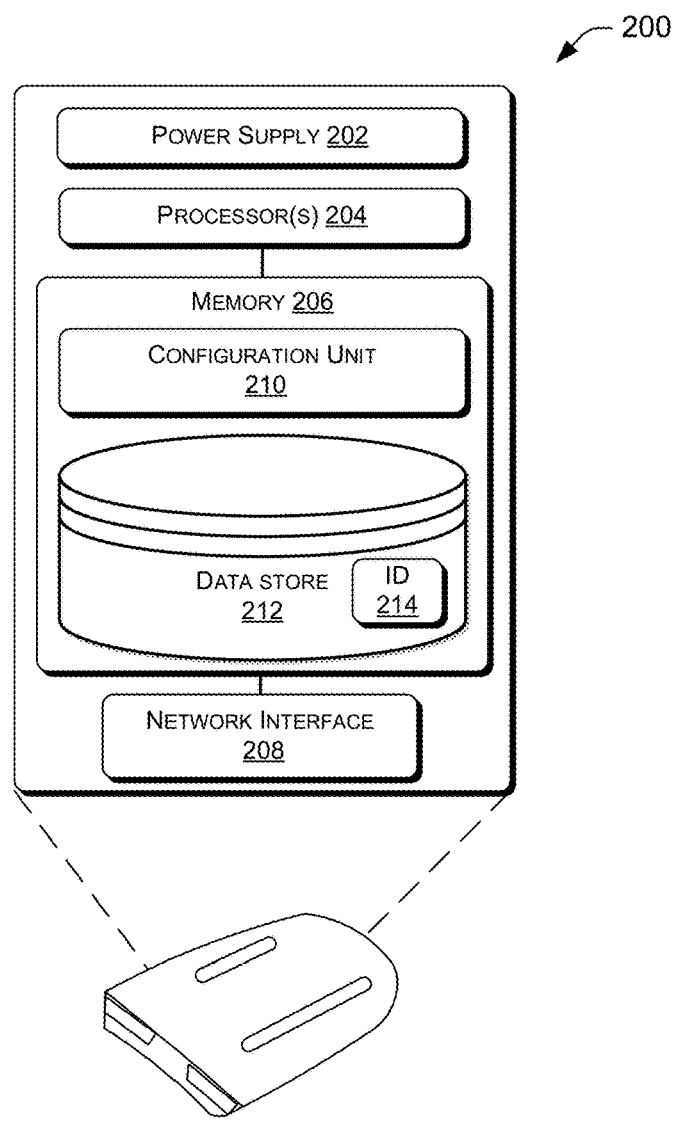
FIG. 2 is a diagram showing components of an example network device that can establish an automatic virtual secure connection with a paired network device.

FIG. 2 is a diagram showing an example network device 200 such as network device 108. As shown in FIG. 2, the network device 200 can include at least one power supply 202, at least one processor 204 coupled to at least one memory 206 and a network interface 208. Power supply 202 can condition power from an electrical plug-in or power from a battery, which can be rechargeable. Unless otherwise indicated herein, processor 204 represents at least one hardware type processor. Memory 206 can include, for example, read-only memory (ROM) and/or flash memory, which can store a start-up program, bootstrap code and/or operational software for the network device, random-access memory (RAM), which can store working files, and/or non-volatile RAM (NVRAM), which can store data regarding paired devices, joined networks, etc., and combinations thereof. In the illustrated example, memory 206 includes a configuration unit 210 and a data store 212. Network device(s) 200 each are assigned a unique device identifier 214, such as a MAC address assigned at the time of manufacture. In various embodiments, the unique device identifier 214 includes a unique hardware identifier protected by cryptosecurity, which may be stored in data store 212. Network device 200 can include one or more network interfaces to allow the network device 200 to connect to a wired or wireless network. Embodiments include network devices 200 configured to automatically connect to a wireless network when the power supply is activated.

Network device 200 can operate independently, akin to a home router on a local or home network 102. In some embodiments a network device 200 can be powered up and automatically connect via network interface 208 and Ethernet or wireless connection to the local network 102. The local network 102 may then connect via the Internet 104 to a central service. In such embodiments, the network device 200 can connect to a central server 112 associated with a retailer from which the network device 200 is purchased or with a separate central service hosted on another server or distributed computing environment 112.

Embodiments include a pre-configuration option, in which the network device 200 is configured during the purchase process, and an initialization option, in which the network device 200 is configured during an initial connection after purchase.

Both example configuration processes enable a purchaser to configure the network device 200 for pairing with one or more other network device(s) 200. In addition, both configuration processes configure the network device 200 for what network(s) the network device 200 should join so that it will perform as a router on the purchaser's local or home network. The network device 200 can advertise itself, or broadcast, as a network gateway to other paired network device(s) 200 so that any network-enabled machine on one local or home network joined with the network device 200 appears to have direct connection or ability to connect with other network-enabled machine on the joined network.

For example, if configured to operate directly between network-enabled machines 110 and the local network 102, the network device 200 can take the place of a router and send an IP address as if behind a network address translator (NAT). As another example, if the network device 200 is not between all of the network-enabled machines 110 on a network 102 and the Internet 104, the network device 200 can operate as a peer on the Internet 104 and advertise itself, broadcast, according to an IP address, indicating that traffic to that IP address should be sent to the network device 200. Then the network device 200 can employ a virtual secure connection, such as virtual secure connection 124, to the network of the paired network device 200. In this way, the network device 200 operates akin to a lower-level router, so the network device 200 can perform independent of the types of devices and operating systems running on a joined network 102. The network device 200 can operate with any network-enabled machine 110 capable of connecting to a network 102 without regard to a hardware type or operating system of the network-enabled machine 110. Embodiments enable connection to network-enabled machines such as printers and external storage without a computer being active on the receiving network 102.

Paired network devices 200 provide for secure connections from unsecure locations. For example, a user can set up a first network device 200 on a home network 102, and while traveling, use a second network device 200 paired with the first to connect back to the home network 102 without connecting through a hotel network. Thus, the traveler can have secure access to everything on the home network 102, independent or agnostic of software being run on the home network 102 or at the travel location.

Illustrative User Interfaces

Figure 3:
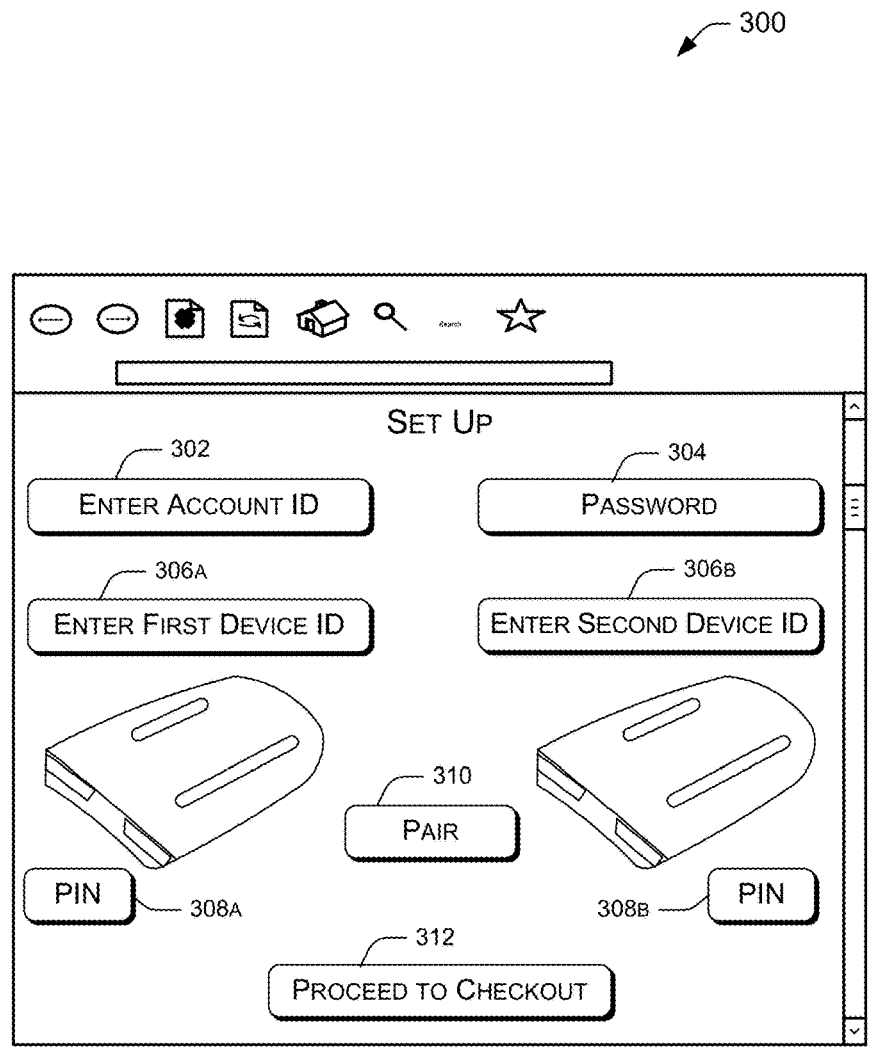
FIG. 3 illustrates an example user interface for pairing network devices.
Figure 4:
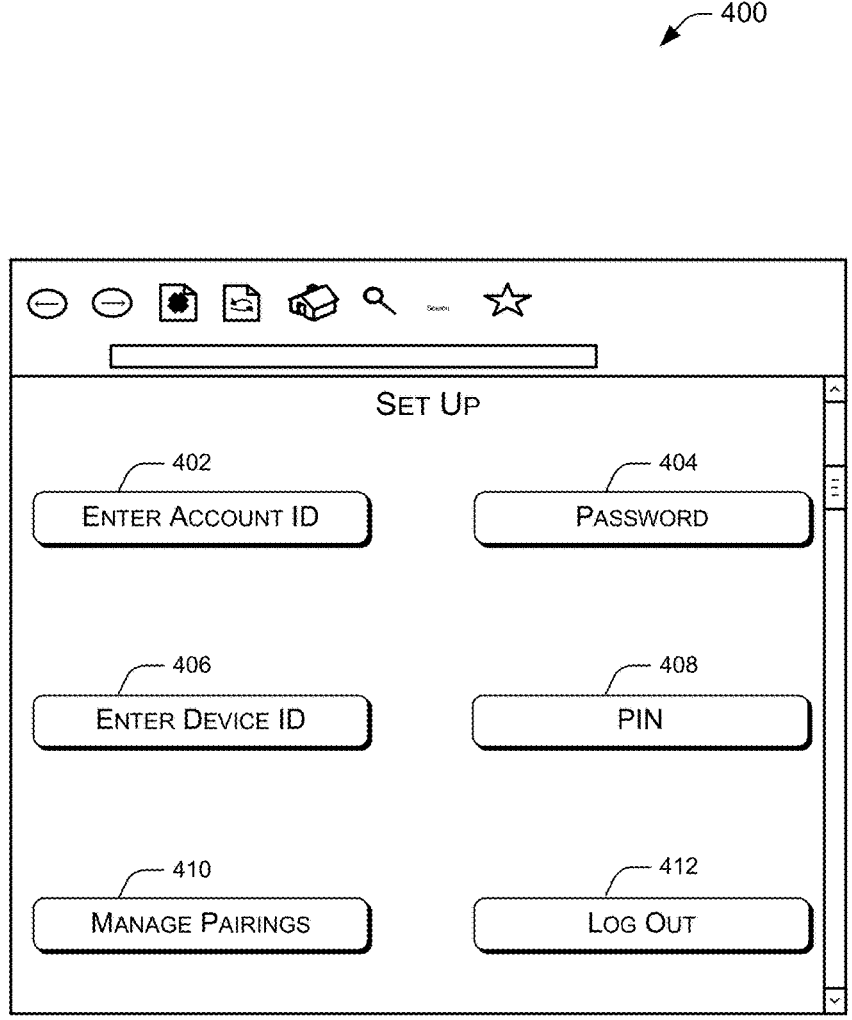
FIG. 4 illustrates an example user interface for registering a network device.
Figure 5:
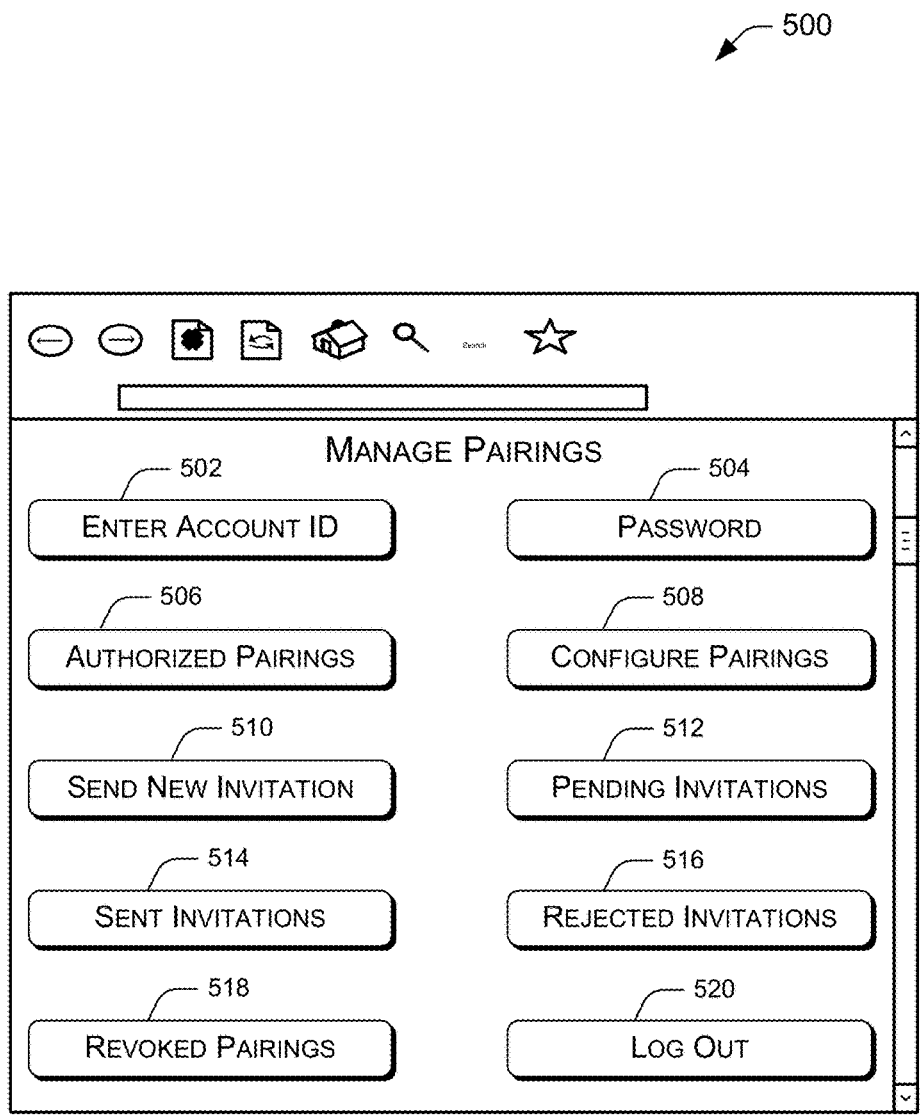
FIG. 5 illustrates an example user interface for managing pairings of network devices.

FIGS. 3-5 illustrate example user interfaces 300, 400, and 500 such as user interfaces generated by user interface module 122. User interfaces 300, 400, and 500 can be presented by any of the number of network-enabled machines 110. For example, during acquisition of one or more of network devices such as network devices 108 or 200, a consumer who acquired e.g., purchased, leased, rented, or borrowed the one or more network devices can access user interface 300 to set up the one or more network devices for operation. As another example, after acquisition of one or more of network devices such as network devices 108 or 200, a purchaser or other recipient of the one or more network devices can access user interface 400 to set up the one or more network devices for operation. As yet another example, a purchaser or other recipient of the one or more network devices 108 or 200 can access user interface 500 to manage pairings of the one or more network devices.

FIG. 3 illustrates an example user interface 300 for a purchaser registering two network devices during the purchase process. Embodiments provide for entry of an account number 302 and password 304 of the purchaser or consumer, for example, an account number associated with the retailer from which the network device(s) are being purchased. In some instances, the purchaser may already be logged in to his or her account, and account number 302 and password 304 may be omitted.

Embodiments provide for entry of a unique device identifier associated with individual ones of the network devices, which in some instances can be a MAC address. When authorized, in some instances, entry, such as via 306A or 306B of the user interface 300 can trigger mining of data associated with the account 302, such as from data store 120, to configure the one or more network devices for use by the purchaser. Association of the unique device identifier of the one or more network devices with the purchaser or other recipient of the network devices can take place via the user interface 300 at 306A or 306B, and can include entry of a Particular Identification Number (PIN) 308A or 308B associated with an individual network device. The PIN may be entered to show that the purchaser or consumer has authorized use of the network device. When authorized use of the network device has been shown, the purchaser or consumer can finish pairing the network devices by selecting a pair control 310 from the user interface 300, and proceed to complete the purchase process or checkout by selecting a proceed to checkout control 312. In some embodiments, a purchaser or consumer may enter a second device identifier 306B and omit the PIN 308B, such as when the purchaser or consumer is arranging for delivery of the second network device to a family member, friend, or colleague (recipient).

FIG. 4 illustrates an example user interface 400 for setting up one or more network devices for operation after acquisition. User interface 400 may be accessed by a purchaser or consumer as a recipient. For example, a recipient can log in to user interface 400 to complete pairing of a network device sent by a purchaser or another consumer.

Embodiments provide for entry of an account number 402 and password 404. In some instances, the recipient may have his or her own account 402, such as an account with the retailer; otherwise, the recipient may be prompted to create an account 402 and enter a password 404 to initialize the pairing.

Embodiments provide for entry of a unique device identifier 406 associated with individual ones of the network devices, which in some instances can be MAC address. When authorized, in some instances, entry of the unique device identifier 406 can trigger mining of data associated with the account 402, such as from data store 120, to configure the network device for use by the recipient. Association of the unique device identifier of the network device with the recipient of the network device can take place via the user interface 400 at 406, and can include entry of a PIN 408 associated with an individual network device to show that the recipient or consumer has authorized the network device and is in actual possession of the network device. For example, a recipient may receive a network device that has had a pre-pairing initiated with another network device, and the recipient may enter the PIN 408 to complete the initialization. As another example, an obfuscated PIN can be included on the network device or within the packaging of the network device, which once used, cannot be reused unless released by the previous user, or through other means. A purchaser or recipient can also select to manage pairings 410, and log out 412 when the setup is completed.

FIG. 5 illustrates an example user interface 500 for managing pairings of one or more network devices 108 or 200. For example, a purchaser, consumer or other recipient can access user interface 500 by selecting to manage pairings 410 from user interface 400. As another example, a purchaser or recipient can log in to his/her account and access user interface 500 directly to manage network device pairings. For example, a purchaser or recipient can log in to his/her account, such as an account with the retailer, and enter his or her account ID 502, and password 504.

Embodiments provide for accessing a list of authorized pairings 506, and for configuring pairings 508. For example, authorized pairings 506 can present each of the initialized network devices 108 or 200 associated with the account, and the purchaser or recipient can select from those network devices for pairing so the network devices can join the respective networks on which they operate. Meanwhile, the purchaser or recipient can configure pairings 508 as one-way or two-way pairings, select from secure communication protocols, and/or designate particular resources, such as network-enabled machines 110, for exclusion from the pairing.

Embodiments provide for sending a new pairing invitation 510, viewing and responding to pending pairing invitations 512, viewing sent pairing invitations awaiting acceptance 514, and viewing rejected pairing invitations 516. Meanwhile, in various embodiments it may be desirable to revoke pairings, for example when an employee is no longer working remotely. Thus, embodiments provide for revoking or viewing revoked pairings 518. A purchaser or recipient can also select to log out 520 when done managing the pairings.

Embodiments provide for network devices, whenever powered on, to call a central server, such as server 112, to obtain activation and pairing information, which can include authorized network configuration information appropriate for the network device to broadcast or advertise itself as a router associated with the local and paired networks. For example, the network device can advertise a range of IP addresses and subnets the network device is using.

Embodiments provide for the network devices being paired to perform subnet masking. For example, when making a new pairing, the network devices being paired can identify that the two separate subnetworks have overlapping IP addresses, which can happen due to routers and/or network devices, such as network devices 108 or 200, being assigned the same subnet range. Thus, in one example, as part of the initialization and pairing process, the first network device can indicate that it is operating on a network with a particular subnet range, and the second network device can indicate that it is operating on a network with a particular subnet range. If the network devices detect an overlap in the respective subnet ranges, one or both network devices can automatically mask and convert all IP addresses in the local or home network to a separate subnet before sending the IP addresses to prevent address range collision. As another example, subnet masking can represent a configurable aspect of pairing accessible via element 508 of user interface 500, which enables adjustment of the IP addresses in outbound packets. The network devices can employ protocols for virtual secure connections, such as standard VPN protocols, and depending on the network configuration, can include a distributed VPN. Thus, in some embodiments, the network devices can use the central service to coordinate the initial connection so both network devices make a connection through their networks to the central service using an Interactive Connectivity Establishment (ICE) protocol. Once coordinated, the paired network devices can connect directly to each other without routing traffic through the central server. When network devices have been pre-paired, the network devices can automatically attempt to connect directly to each other via a virtual secure connection, such as a VPN tunnel, and if the connection is not successful, connect to the central server as an intermediary to make a fail-safe connection.

Network devices as described herein can operate with various flavors of virtual secure connections such as secure socket tunneling protocol (SSTP), OpenVPN protocol, Layer Two Tunneling Protocol/Internet Protocol Security (L2TP/IPSec), Secure Socket Layer-VPN (SSL-VPN), etc. with appropriate corresponding encryption. In some embodiments once initially configured to pair, or as part of the initialization process, a consumer can select a desired protocol for the connection.

Illustrative Processes

Figure 6:
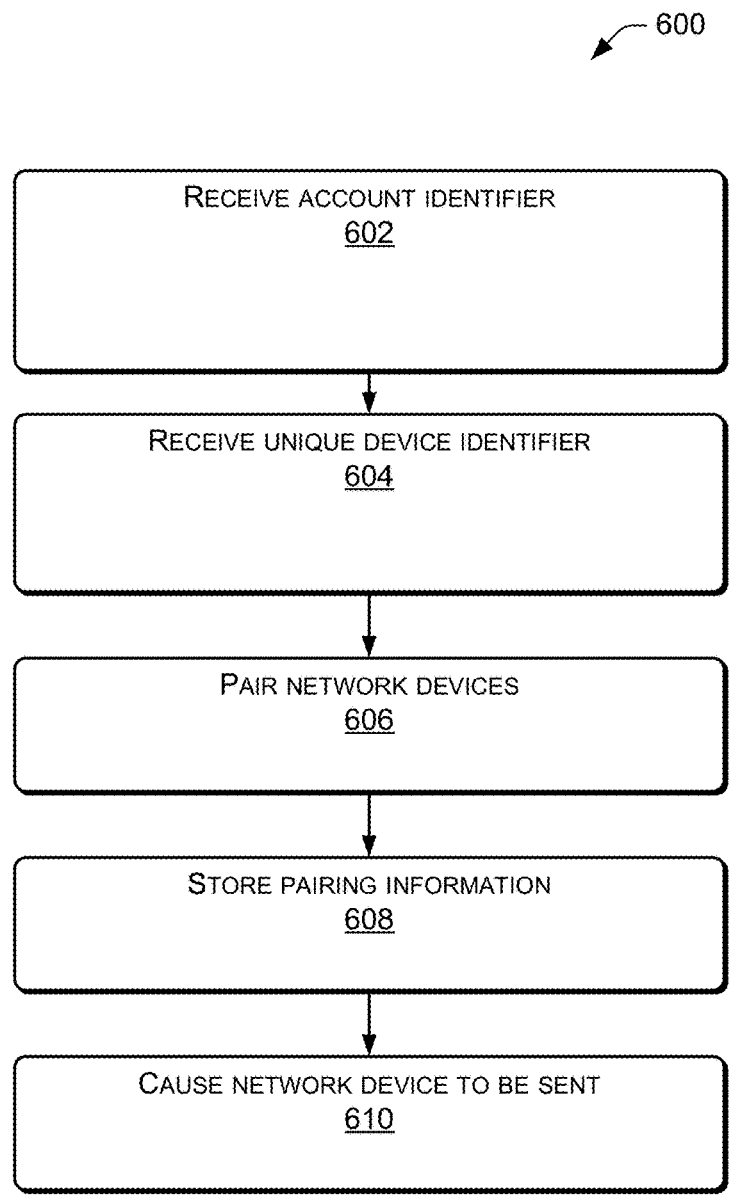
FIG. 6 is a flow diagram depicting an illustrative process for provisioning network devices for establishing an automatic virtual secure connection.
Figure 7:
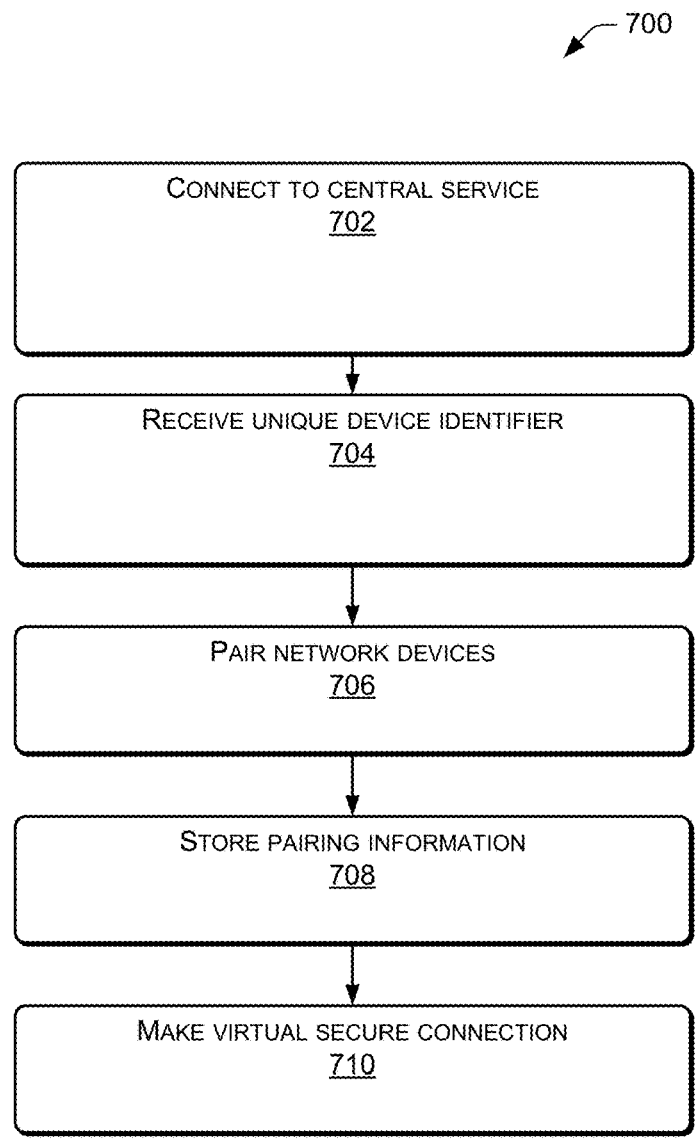
FIG. 7 is a flow diagram depicting an illustrative process for establishing an initial automatic virtual secure connection between network devices.

FIGS. 6 and 7 describe example processes for automatic virtual secure connection using paired network devices. The example processes are described in the context of the environment of FIGS. 1-5, but are not limited to those environments. The processes are illustrated as logical flow diagrams, each operation of which represents an operation in the illustrated or another sequence of operations that may be implemented in hardware or in software implemented by hardware. In the context of software, the operations represent computer-executable instructions stored on one or more memories or non-transitory computer-readable media 116 or 206 that, when executed by one or more processors 114 or 204, configure a network device to perform the recited operations. Generally, computer-executable instructions include routines, programs, objects, components, data structures, and the like that configure a computing device to perform particular functions or implement particular abstract data types.

The memory or non-transitory computer-readable media 116 or 206 may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions, as described above. Finally, the order in which the operations are described is not intended to be construed as a limitation, and any number of the described operations may be combined in any order and/or in parallel to implement the process.

FIG. 6 illustrates a process for, during the purchase of one or more network devices, provisioning the one or more network devices to make an automatic virtual secure connection according to pairing of at least two network devices. In this regard, block 602 illustrates receiving an account identifier for a purchaser. As described above, the configuration unit 118 and/or 208 can configure one or more network devices to be associated with a purchaser's account.

Block 604 illustrates receiving a unique device identifier assigned to an individual network device such as a MAC address 212. As described above, individual of the network devices 108 or 200 can be configured to operate on particular networks such as networks 102A and 102B and to pair with particular other network devices 108 or 200. Accordingly, to identify individual network devices, a unique device identifier for each network device can be received via scanning or otherwise obtaining during the purchase process, e.g., by scanning a bar code during order fulfilment and/or via entry such as in a user interface like user interface 300 and/or user interface 400.

Block 606 illustrates pairing two or more network devices such as network devices 108 or 200. As described above, individually identified network devices can be configured to pair with other individually identified network devices. The configuration unit 118 and/or 208 can cause the network devices to be set for a particular secure communication protocol.

Block 608 illustrates storing information designating the pairing of two or more network devices, and in some embodiments, the associated protocol. As described above, the configuration unit 118 can store the pairing information associated with the unique device identifier and with the purchaser's account in data store 120.

Block 610 illustrates causing the one or more network devices to be sent to the purchaser or other designated recipient. As described above, the user interface module can accept instructions for the network devices to be delivered to one or more addresses. In some instances, the user interface module can provide for the network devices to be sent to a physical address associated with the purchaser.

FIG. 7 illustrates a process for initialization of one or more network devices outside of the provisioning process of FIG. 6. Block 702 illustrates connecting a network device to a central service to configure the network device to make a virtual secure connection with another network device. As described above, the network devices may be configured, at least partly, during purchase. Upon being powered on and connecting to a local network via a wireless or wired connection, a network device can connect to a central service for initialization, such as to identify another network device to which the instant network device should pair and/or to associate the network device with a recipient and/or network.

Block 704 illustrates receiving a unique device identifier assigned to an individual network device. As described above, an individual network device can be configured to operate on particular networks and to pair with particular other network devices. Accordingly, to identify the individual network devices, a unique device identifier for each network device can be received through user interface 300 and/or user interface 400. In addition, embodiments provide for receiving an associated PIN, which can be received through user interface 300 and/or user interface 400 to show that the recipient or consumer has authorized the network device and is in actual possession of the network device.

Block 706 illustrates pairing two or more network devices. As described above, individually identified network devices for which authorized use has been shown can be configured to pair with other individually identified network devices. The configuration unit 118 can cause the network devices to be set for a particular secure communication protocol.

Block 708 illustrates storing information designating the pairing of two or more network devices and the associated protocol. As described above, the configuration unit 118 can store the pairing information associated with the unique device identifier and/or with the consumer's account in data store 120.

Block 710 illustrates making a virtual secure connection between two or more network devices according to the protocol associated with the unique device identifiers associated with the respective two or more network devices. As described above, the configuration unit 118 can configure the network devices to make a virtual secure connection between paired network devices.

A network device can operate as a peer on a local network. As described above, the network device can advertise itself, or broadcast, as a gateway to the local network so a paired network device can access the local network through the virtual secure connection.

Embodiments provide for optional traffic optimization. As described above, the network device can be registered for traffic analysis. When registered for traffic analysis, the network device can record or send anonymized data and submit the anonymized data to a central server. In aggregate, the anonymized data can be used to improve future updates, employ advanced compression, enforce inbound network security, etc.

Embodiments provide for use of aggregated anonymized data. For example, if the aggregated anonymized data showed that users were using the virtual secure connections to perform remote printing, the virtual secure connection could be optimized for printer traffic in comparison to sharing home movies, for which another optimization would be appropriate. As another example, the network device can employ advanced compression beyond what an associated application in use would employ because the traffic is going between two dedicated hardware devices. As yet another example, traffic analysis and the use of network devices as described herein can provide optimization for security because as dedicated hardware devices the network devices can enforce firewalling and other inbound network security features.

Conclusion

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

I claim:

1. A computer-implemented method comprising:
   receiving a particular value associated with a first physical tunneling device;
   associating the particular value with the first physical tunneling device;
   assigning a first Internet protocol (IP) address to the first physical tunneling device;
   assigning a second Internet protocol (IP) address to a second physical tunneling device;
   configuring the first physical tunneling device to, at a time at which (i) the first physical tunneling device is powered on and connected to a first network and (ii) the second physical tunneling device is powered on and connected to a second network that is different from the first network, automatically make a secure tunnel connection to the second physical tunneling device in accordance with a selected security protocol, the secure tunnel connection enabling one or more first devices on the first network to exchange data with one or more second electronic devices on the second network;
   after delivery of the first physical tunneling device, receiving an inputted value for the first physical tunneling device;
   determining that the inputted value matches the particular value; and
   based at least in part on determining that the inputted value matches the particular value, initializing the first physical tunneling device.

2. The computer-implemented method as recited in claim 1, wherein the first physical tunneling device is configured to communicate over the secure connection with a network-enabled machine connected to the second physical tunneling device without regard to at least one of a type of the network-enabled machine or an operating system of the network-enabled machine.

3. The computer-implemented method as recited in claim 1, wherein the secure connection enables a network-enabled machine on the first network to which the first IP address is assigned to use resources accessible to the second physical tunneling device.

4. A system comprising:
   one or more processors; and
   one or more computer-readable media storing computer-executable instructions that, when executed by the one or more processors, cause the one or more processors to perform acts comprising:
      receiving a particular value associated with a first physical tunneling device;
      associating the particular value with the first physical tunneling device;
      registering the first physical tunneling device and a second physical tunneling device to each other;
      assigning a first device identifier to the first physical tunneling device;
      assigning a second device identifier to the second physical tunneling device;
      configuring the first physical tunneling device to, at a time at which (i) the first physical tunneling device is powered on and connected to a first network and (ii) the second physical tunneling device is powered on and connected to a second network, automatically make a secure connection to the second physical tunneling device, the secure connection enabling one or more first devices on the first network to exchange data with one or more second electronic devices on the second network;

after delivery of the first physical tunneling device, receiving an inputted value for the first physical tunneling device;

determining that the inputted value matches the particular value; and based at least in part on determining that the inputted value matches the particular value, initializing the first physical tunneling device.

5. The system as recited in claim 4, wherein configuring the first physical tunneling device comprises configuring the first physical tunneling device to communicate over the secure connection with a network-enabled machine connected to the second physical tunneling device without regard to at least one of a type of the network-enabled machine, or an operating system of the network-enabled machine.

6. The system as recited in claim 4, wherein the secure connection enables a network-enabled machine on the first network to which the first device identifier is assigned to use resources accessible to a second network-enabled machine connected to the second network through the second physical tunneling device.

7. A non-transitory computer-readable medium having stored thereon instructions that, when executed by a processor cause the processor to perform the acts of:

receiving a particular value for a first physical tunneling device;

associating the particular value with the first physical tunneling device;

registering the first physical tunneling device and a second physical tunneling device to each other;

assigning a first device identifier to the first physical tunneling device;

assigning a second device identifier to the second physical tunneling device; and configuring the first physical tunneling device to, at a time at which (i) the first physical tunneling device is powered on and connected to a first network and (ii) the second physical tunneling device is powered on and connected to a second network that is different from the first network, automatically make a secure connection to the second physical tunneling device, the secure connection enabling one or more first devices on the first network to exchange data with one or more second electronic devices on the second network;

after delivery of the first physical tunneling device, receiving an inputted value for the first physical tunneling device;

determining that the inputted value matches the particular value; and based at least in part on determining that the inputted value matches the particular value, initializing the first physical tunneling device.

8. The non-transitory computer-readable medium as recited in claim 7, wherein the first physical tunneling device is configured to communicate over the secure connection with a network-enabled machine connected to the second physical tunneling device without regard to at least one of a type of the network-enabled machine, or an operating system of the network-enabled machine.

9. The non-transitory computer-readable medium as recited in claim 7, wherein the secure connection enables a network-enabled machine on the first network and to which the first device identifier is assigned to use resources accessible to a second network-enabled machine connected to the second physical tunneling device.

10. A computer-implemented method comprising:

receiving input;

associating a first physical tunneling device to the input;

associating the first physical tunneling device to a second physical tunneling device;

configuring the first physical tunneling device to automatically make a secure connection to the second physical tunneling device when or after the first physical tunneling device powers on, the secure connection enabling one or more first devices connected to the first physical tunneling device to exchange data with one or more second electronic devices connected to the second physical tunneling device;

after delivery of the first physical tunneling device, receiving an inputted value for the first physical tunneling device;

determining that the inputted value matches the input; and based at least in part on determining that the inputted value matches the input, initializing the first physical tunneling device.

11. The computer-implemented method as recited in claim 10, further comprising:

assigning a first Internet protocol (IP) address to the first physical tunneling device; and assigning a second IP address to the second physical tunneling device.

12. The computer-implemented method as recited in claim 10, wherein the first physical tunneling device is configured to communicate over the secure connection with a network-enabled machine connected to the second physical tunneling device without regard to at least one of a type of the network-enabled machine, or an operating system of the network-enabled machine.

13. The computer-implemented method as recited in claim 10, wherein the secure connection enables a network-enabled machine to use resources accessible to the second physical tunneling device.

14. The computer-implemented method as recited in claim 1, further comprising:

providing a user interface to enable management of at least one of the first physical tunneling device or the second physical tunneling device.

15. The system as recited in claim 4, the acts further comprising:

providing a user interface to enable management of at least one of the first physical tunneling device or the second physical tunneling device.

16. The non-transitory computer-readable medium as recited in claim 7, wherein registering the first physical tunneling device and the second physical tunneling device to each other includes registering the first physical tunneling device and the second physical tunneling device to a user account.

17. The computer-implemented method as recited in claim 1, further comprising:

registering the first physical tunneling device to the second physical tunneling device; and registering the first physical tunneling device and the second physical tunneling device to a user account.

18. The system as recited in claim 4, wherein registering the first physical tunneling device and the second physical tunneling device to each other includes
registering the first physical tunneling device and the second physical tunneling device to a user account.

19. The non-transitory computer readable medium as recited in claim 7, the acts further comprising:
providing a user interface to enable management of at least one of the first physical tunneling device or the second physical tunneling device.

20. The computer-implemented method as recited in claim 10, further comprising:
providing a user interface to enable management of at least one of the first physical tunneling device or the second physical tunneling device.

* * * * *